US007817082B2

(12) United States Patent
Dwelly et al.

(10) Patent No.: US 7,817,082 B2
(45) Date of Patent: Oct. 19, 2010

(54) MULTI FREQUENCY SPECTRAL IMAGING RADAR SYSTEM AND METHOD OF TARGET CLASSIFICATION

(75) Inventors: Wesley Howard Dwelly, Tucson, AZ (US); Vinh Nguyen Adams, Tucson, AZ (US)

(73) Assignee: VAWD Applied Science and Technology Corporation, Tucson, AZ (US)

( * ) Notice: Subject to any disclaimer, the term of this patent is extended or adjusted under 35 U.S.C. 154(b) by 578 days.

(21) Appl. No.: 12/284,635

(22) Filed: Mar. 11, 2007

(65) Prior Publication Data
US 2009/0146869 A1 Jun. 11, 2009

(51) Int. Cl.
G01S 13/10 (2006.01)
G01S 13/88 (2006.01)
G01S 13/89 (2006.01)
G01S 13/00 (2006.01)

(52) U.S. Cl. .......... 342/90; 342/89; 342/118; 342/134; 342/135; 342/175; 342/176; 342/179; 342/192; 342/193; 342/195; 342/196

(58) Field of Classification Search .......... 342/21, 342/27, 28, 82–103, 118, 128, 130–145, 342/175, 176, 179, 188–197, 73–75, 80, 342/147, 149–154, 159–162, 22, 59
See application file for complete search history.

(56) References Cited

U.S. PATENT DOCUMENTS

| 3,383,678 A | * | 5/1968 | Palmer | 342/28 |
| 3,614,719 A | * | 10/1971 | Treacy | 342/82 |
| 3,719,945 A | * | 3/1973 | Sletten et al. | 342/193 |
| 3,725,917 A | * | 4/1973 | Sletten et al. | 342/193 |
| 3,796,208 A | * | 3/1974 | Bloice | 342/28 |
| 3,983,558 A | * | 9/1976 | Rittenbach | 342/160 |
| 3,993,995 A | * | 11/1976 | Kaplan et al. | 342/194 |
| 4,016,528 A | * | 4/1977 | Takeuchi | 342/160 |
| 4,101,890 A | * | 7/1978 | Goyard | 342/193 |
| 4,348,674 A | * | 9/1982 | Muth et al. | 342/192 |
| 4,450,444 A | * | 5/1984 | Wehner et al. | 342/194 |
| 4,673,940 A | * | 6/1987 | Barley et al. | 342/192 |
| 5,376,940 A | * | 12/1994 | Abatzoglou | 342/192 |
| 5,448,501 A | * | 9/1995 | Hablov et al. | 342/28 |
| 5,760,687 A | * | 6/1998 | Cousy | 342/27 |
| 5,774,088 A | * | 6/1998 | Kreithen | 342/22 |
| 5,790,032 A | * | 8/1998 | Schmidt | 342/28 |
| 5,867,257 A | * | 2/1999 | Rice et al. | 342/192 |
| 6,031,482 A | * | 2/2000 | Lemaitre et al. | 342/22 |
| 6,208,286 B1 | * | 3/2001 | Rostislavovich et al. | 342/135 |
| 6,337,654 B1 | * | 1/2002 | Richardson et al. | 342/90 |
| 6,417,797 B1 | * | 7/2002 | Cousins et al. | 342/179 |
| 6,437,728 B1 | * | 8/2002 | Richardson et al. | 342/90 |
| 7,148,836 B2 | * | 12/2006 | Romero et al. | 342/22 |
| 7,345,618 B1 | * | 3/2008 | Cole et al. | 342/22 |

* cited by examiner

Primary Examiner—Bernarr E Gregory
(74) Attorney, Agent, or Firm—Advent IP; Kevin E. West

(57) ABSTRACT

Techniques to image life forms through obstructions and at long standoff ranges employ a radar system that simultaneously transmits a plurality of RF pulse trains having different transmission frequencies and receives returns of the RF pulse trains reflected from a life form target. The returns are processed to generate digital radar data associated with the transmission frequency of each RF pulse train. The digital radar data is segmented and averaged to generate a Doppler spectrum response associated with the transmission frequency of each RF pulse train. Target classification is performed using the Doppler spectrum responses to extract biometric data describing the life form target.

21 Claims, 8 Drawing Sheets

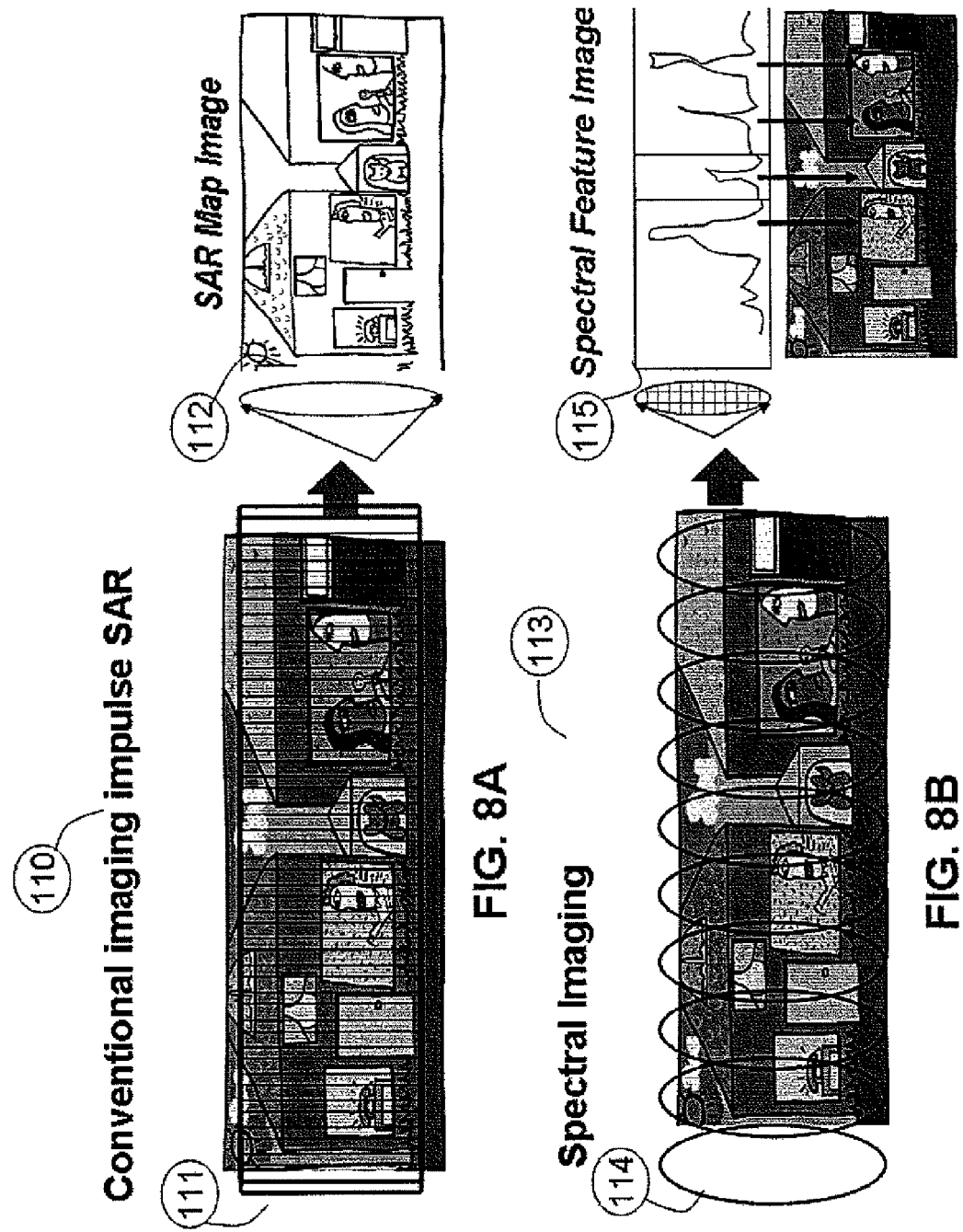

MULTI FREQUENCY SPECTRAL IMAGING RADAR SYSTEM AND METHOD OF TARGET CLASSIFICATION

BACKGROUND

This disclosure relates to pulsed radar systems, and more specifically to a radar system and method of target classification capable of determining life form target type and movements.

See or sense through obstruction sensors are needed to satisfy current and future operations for enhanced capability to detect, locate, identify, and classify moving and stationary humans for rescue and clearing operations. The sensors could be used by the military, police, security, and firemen. Additionally the sensors could provide standoff human biometric monitoring for medical personnel to help save lives.

Radar technology sensors can be used for standoff range sensing. Radar can measure both the range to target and the "Doppler" or velocity of the target.

Prior approaches have involved impulse radars and pulse compression radars. Impulse radar transmits an ultra short pulse for high range resolution. Less than 1 nsec pulses are required to image a human target. The short pulses result in very little energy on target. In each of these cases, the goal it to achieve a range resolution for target imaging while applying as much energy on the target as possible.

Faced with the constraints of range resolution verses energy on target, Radar Systems use a concept called pulse compression. Pulse compression refers to a family of techniques that increase the bandwidth of radar pulses without shortening the pulse width. The result is a range resolution which is higher than that associated with an uncoded pulse. Many methods exist to achieve this, including binary phase coding, polyphase coding, frequency modulation, and frequency stepping. A side-effect of these techniques is the appearance of range sidelobes of significant amplitude in the range profile. These range sidelobes can result in a small target of interest being masked by a large target that is nearby.

Radar systems presently do not have adequate capability to image life forms for classification. For example classifying humans vs. dogs or classifying human movements. The reasons for this are fivefold. First, legacy radar systems are designed with imaging techniques that partition the illuminated area into high-resolution segments or pixels. These pixels are viewed like photographs. Humans use these radar photographs to design another layer of signal processing for target classification. This process is inefficient for extracting life form biometric information out of the radar data. Second, the instantaneous bandwidth to image a human would result in very short pico-second pulse widths which results in very little energy on target. Third, classical pulse compression techniques suffer from range sidelobes that distort target information and mask small target features. Fourth, until recently most radar applications and associated signal processing techniques were developed to detect fast moving targets with a large radar cross-section. For example, airplanes, missiles, and fast moving vehicles produce a large return with a large Doppler shift from DC, not small radar cross-section targets with very small Doppler shifts like a human target. Finally, there is no known technique for effectively imaging and classifying life-form targets.

More recently efforts have been made to apply pulsed radar to urban environments or an urban battlefield. In these environments the target signatures are much weaker. Instead of fast moving aircraft or missiles the targets are humans or slow moving vehicles, which present a much smaller radar cross-section and Doppler shift. Additionally the presence of buildings and other large structures exacerbates the range side lobe problem.

There is a demonstrated and ongoing need for a radar system that can accurately detect and classify life form movements in a heavily cluttered urban or foliage environments.

SUMMARY

Techniques are described to image life forms through obstructions and at long standoff ranges. In an implementation, a radar system simultaneously transmits a plurality of RF pulse trains having different transmission frequencies and receives returns of the RF pulse trains reflected from a life form target. The returns are processed to generate digital radar data associated with the transmission frequency of each RF pulse train. The digital radar data is segmented and processed to generate a Doppler spectrum response associated with the transmission frequency of each RF pulse train. Target classification is performed using the Doppler spectrum responses to extract biometric data describing the life form target.

BRIEF DESCRIPTION OF THE DRAWINGS

FIGS. 8A and 8B illustrate a comparison between a conventional SAR system and a radar system in accordance with one or more embodiments of the present disclosure.

DETAILED DESCRIPTION

The following description and the drawings illustrate specific embodiments of the invention sufficiently to enable those skilled in the art to practice them. Other embodiments may incorporate electrical, process, structural and other changes. Examples merely typify possible variations. Individual components are optional unless explicitly required, and the sequence of operations may change. Portions and features of some embodiments may be included in or substituted. Embodiments of the invention set forth in the claims encompass all equivalents of those claims.

The present disclosure describes a pulsed radar system and method of detecting and classifying movements and particular human or animal motion such as walking and breathing. The radar system simultaneously transmits a plurality of RF pulse trains each at a different frequency. The pulse widths are in the range of 2 to 200 nanoseconds. The frequencies are spaced greater than 400 MHz apart. In some embodiments, the frequencies may be harmonically related. For example, 3 three transmit frequencies of 1 GHZ, 2 GH and 4 GHZ. Each frequency pulse train is independently received, down converted and analog to digital converted. In some embodiments, the independent frequencies can be down converted into a single intermediate receiver channel with closely spaced orthogonal frequencies for independent sampling with a single analog to digital converter.

The digital radar data associated with each transmit frequency is segmented and averaged until the frequency and sample time product is nearly equal. In an example embodiment of 3 transmit frequencies of 1 GHz, 2 GHz and 4 GHz, the segmented data is 1 second of data, averaged two ½second segments of data, average four ¼second segments of data. A Fast Fourier Transform (FFT) is performed on each of the data segments. Target classification is performed on the spectral ratio between each FFT to extract life form biometric information.

Figure 1:
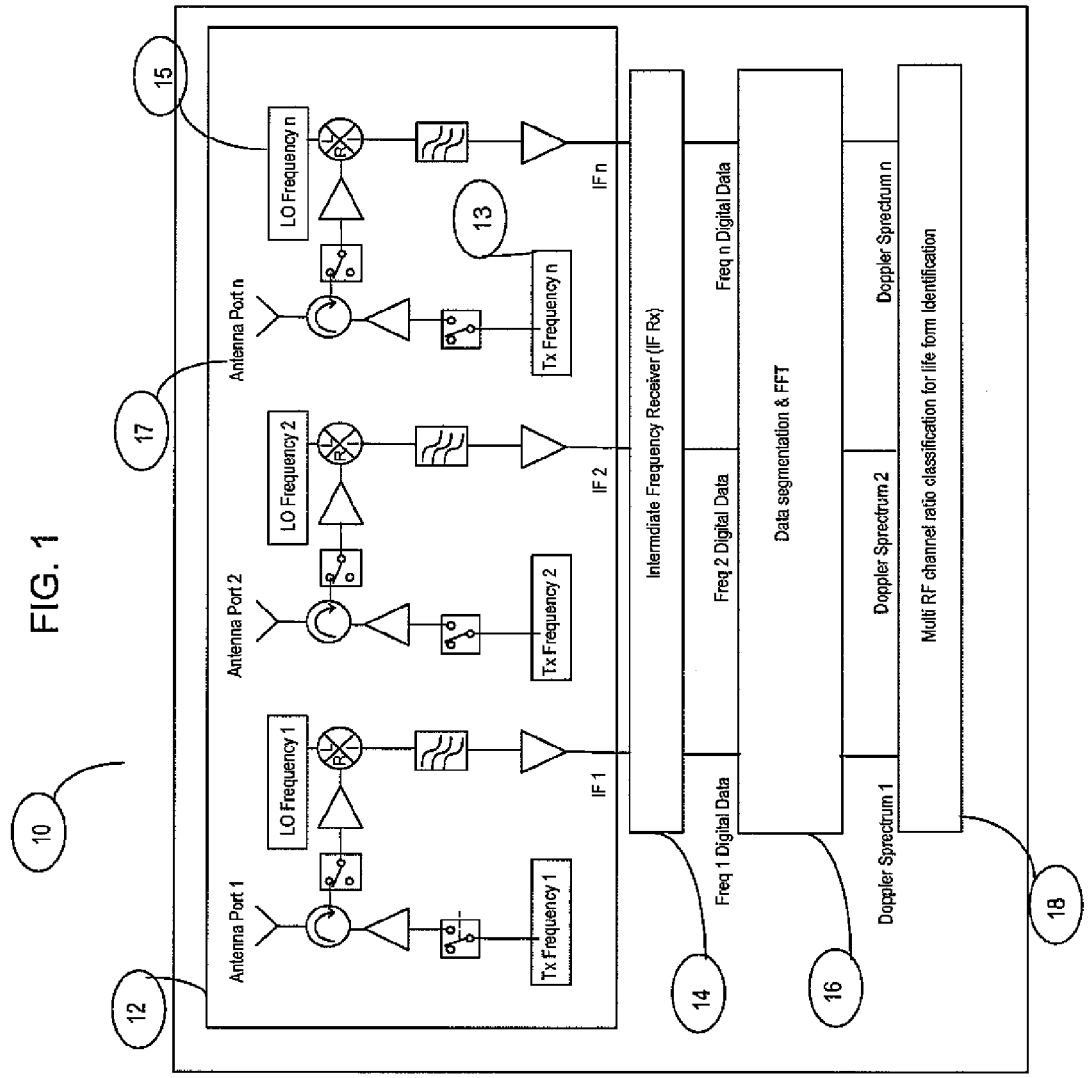
FIG. 1 illustrates a block diagram of a radar system in accordance with one or more embodiments of the present disclosure.

FIG. 1 is a simplified block diagram of the illustrative implementation of the radar system in accordance with the teachings of the present invention. The system 10 has multiple transmit/receive (Tx/Rx) channels 12. Each of the Tx/Rx channels 12 have a different Transmit Frequency 13 (Tx Frequency n) and Local Oscillator Frequency 15 (LO Frequency n). The Tx/Rx channels simultaneously transmit Radio Frequency (RF) pulses into independent antenna ports 17. Alternately the multiple antenna ports can be substituted with a power combiner into a single wideband antenna feed in accordance with conventional teachings.

The Tx/Rx channels simultaneously receive the RF reflected signal and output independent Intermediate Frequency (IF) to the IF receiver 14. The IF receiver 14 digitizes analog information into digital data for signal processing in accordance with conventional teachings.

The digital data from the IF receiver 14 is segmented and pre-processed with FFT's 16. Each frequency channel is segmented and processed differently depending on the relative frequencies of each channel.

The segmented and pre-processed data out of 16 contains individual Doppler spectrum associated with the target response to each transmitted frequency channel. Each frequency channels Doppler spectrum is sent to a spectrum classifier 18 for classification of life form type and movements such as humans walking, sitting or standing.

Figure 2:
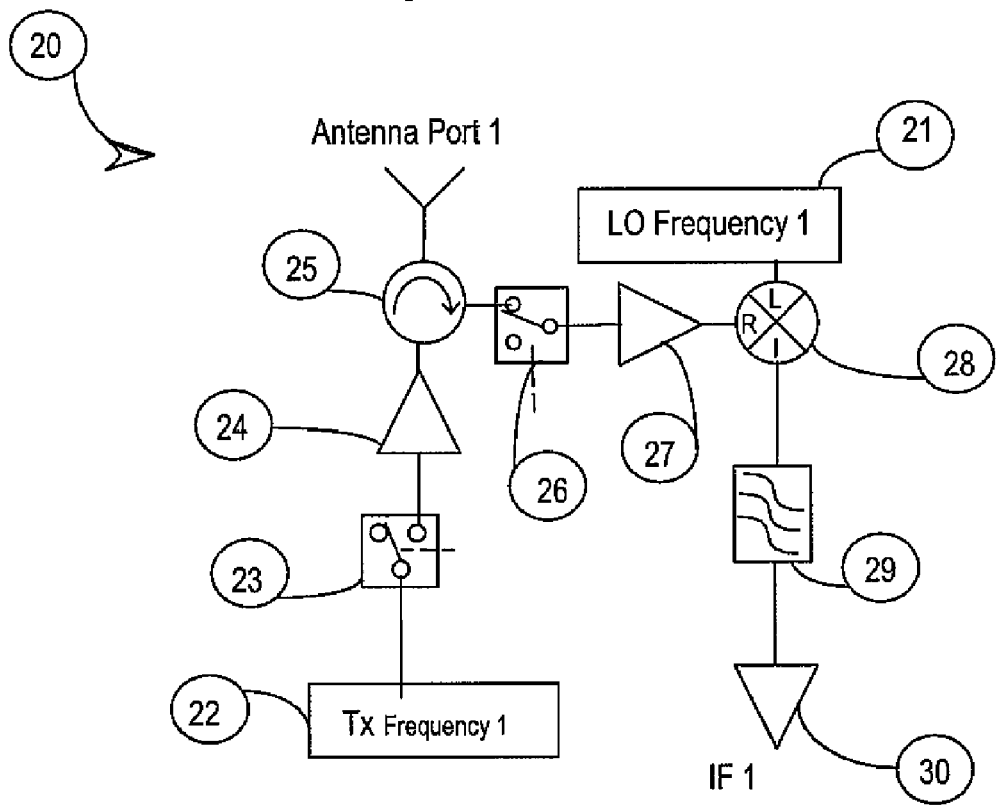
FIG. 2 illustrates a block diagram of a radar transmit receive module in accordance with one or more embodiments of the present disclosure.

FIG. 2 is a simplified block diagram showing an illustrative implementation of a Tx/Rx channel in accordance with present teachings. The Tx/Rx channel 20 is adapted to transmit a unique frequency and receive its reflection off of targets. The unique frequency is set by the transmit frequency source 22. The source frequency is modulated with an RF switch 23. The pulse width is 2 nanoseconds (nsec) to 30 nsec wide. The on off isolation of RF switch 23 is greater than 60 dB. The pulse modulated RF pulse is amplified with a power amplifier 24. The output of the power amplifier 24 is fed to a circulator 25. The output of the circulator is fed to the antenna port while the circulator 25 return path is fed to receiver blanking switch 26. In some embodiments the circulator can be replaced with two antenna ports one port fed directly from the power amplifier 24 and the other fed directly to receiver blanking switch 26.

Receiver blanking switch 26 is set to it's on (low loss) state for the time interval associated with the target range of interest. The switch 26 is in it's off (high isolation) state for the remainder of the time to prevent unwanted RF signals entering into the receiver in accordance with present teachings.

Reflected RF energy from the target is amplified with a low noise amplifier 27 and down-converted through mixer 28 with an LO Frequency 21. LO Frequency 21 is designed to be offset from the Tx Frequency 22 by an amount that simplifies the IF receiver design in accordance with present teachings. The mixer output is filtered 29 for a single sideband and amplified with a low noise amplifier 30 before sending it to the IF receiver.

Figure 3:
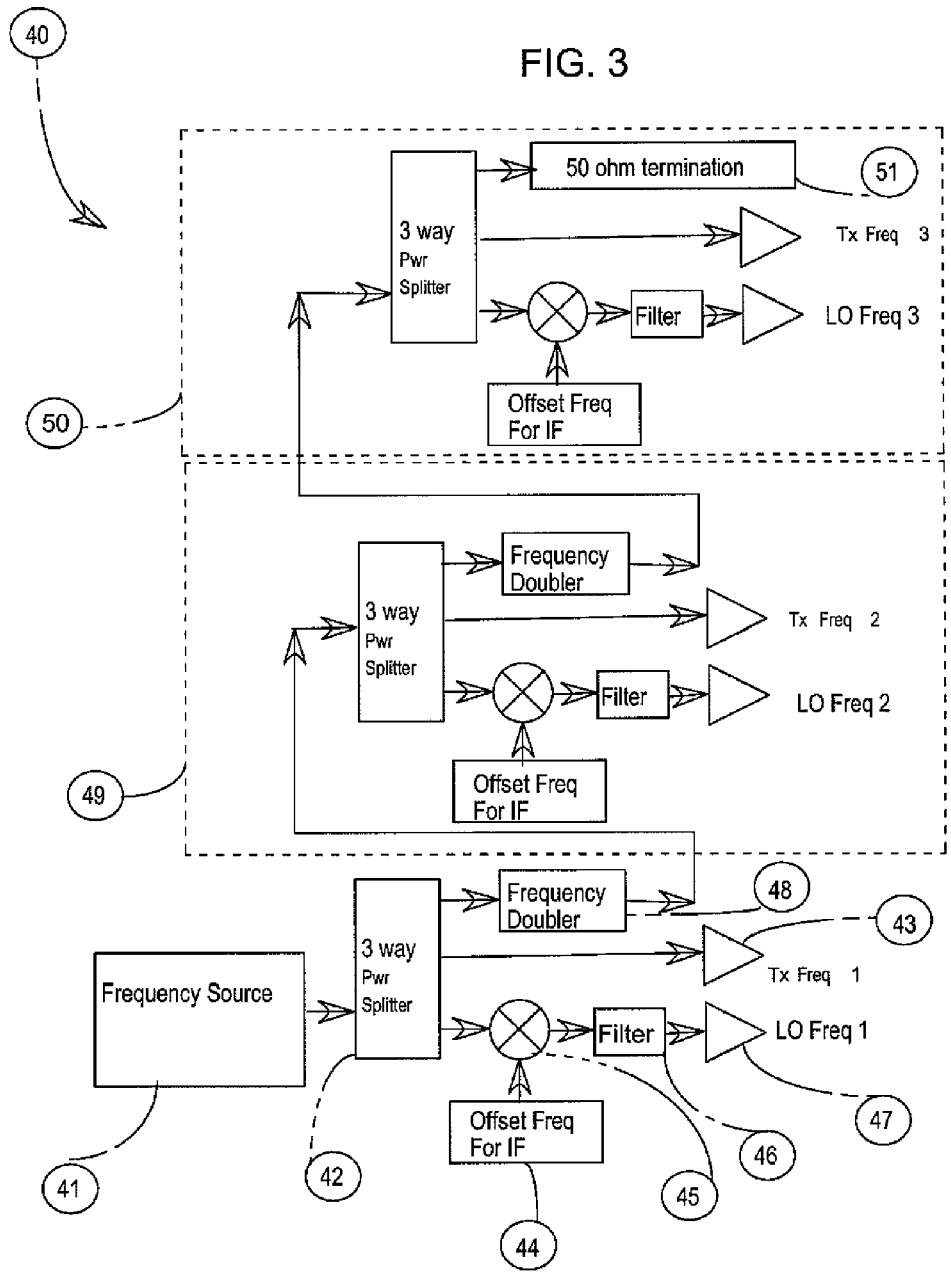
FIG. 3 illustrates a block diagram of multiple transmit frequency generation in accordance with one or more embodiments of the present disclosure.

FIG. 3 is a simplified block diagram showing an illustrative implementation of a preferred method to efficiently generate harmonically related frequencies. Harmonically related frequencies simplify the hardware and signal processing but the invention is not limited to this approach. FIG. 3 is a simplified block diagram illustrating harmonic frequency generation. Frequency source 41 is set for the lowest frequency, for example 1 GHz. Three way power splitter 42 feeds amplifier 43 as the transmit frequency. The power splitter 42 also feeds a mixer that produces an offset frequency from the transmit frequency. Offset frequency 44 is typically set with a Direct Digital Synthesizer (DDS). The offset is typically 250 MHz to 500 MHz but not limited to these frequencies. Mixer 45 is typically a single sideband mixer or a double balanced mixer consistent with present teachings. Filter 46 filters out one of the sidebands and is amplified with amplifier 47 to generate the LO frequency. The third output of the power splitter is fed to a frequency doubler 48.

The doubled frequency is fed to the next frequency generation circuit 49. Frequency generation circuit 49 is an identical topology as 42, 44, 45, 46, 47, 43, and 48 where the components are optimized for the doubled frequency.

The doubled frequency of 49 is fed to the last stage 50. The last frequency generation topology is identical to 49 except the frequency doubler is replaced with a 50 ohm termination 51 and the components are optimized for a higher frequency.

Frequency generation topology 40 could be reversed with the frequency source 41 set to the highest frequency and with the frequency doubler circuits being replace by divide by two circuits.

Figure 4:
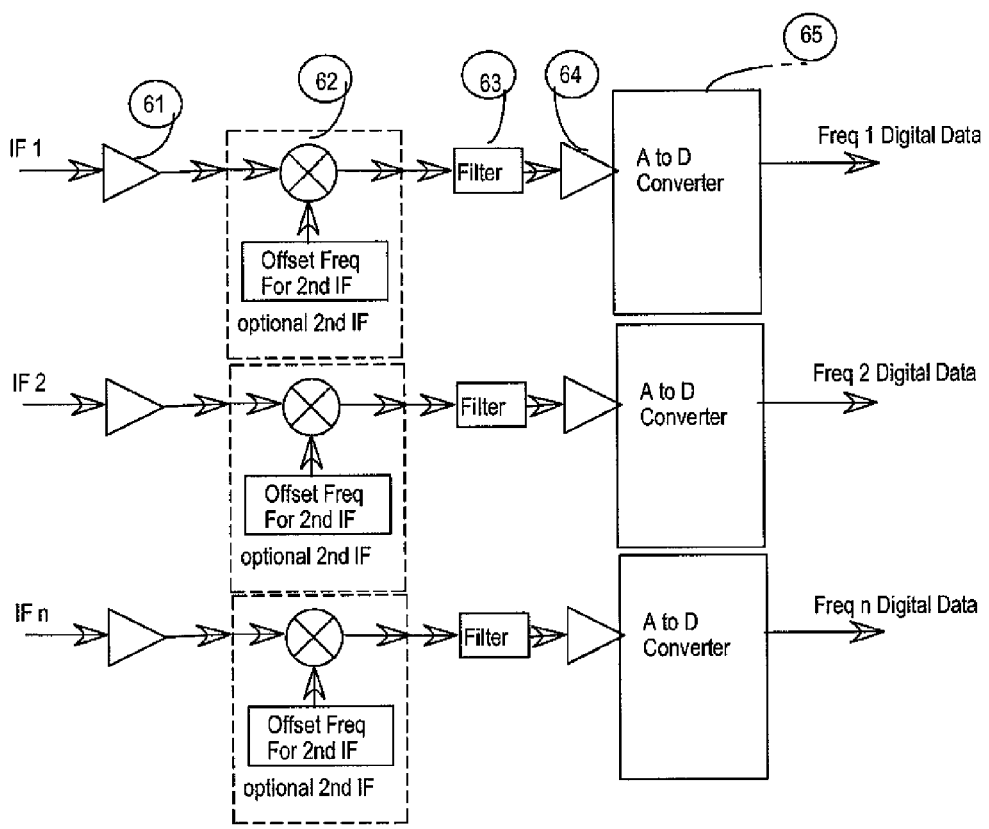
FIG. 4 illustrates a block diagram of a multiple channel Intermediate Frequency receiver in accordance with one or more embodiments of the present disclosure.

FIG. 4 is a simplified block diagram showing an illustrative implementation of a standard three channel IF receiver 60. The example IF receiver 60 has three identical channels. The number channels are not limited to three and will equal the number of simultaneous frequency channels required by the application, typically 2 to 7 channels, but could be more if required. IF receiver 60 converts the analog signals into digital data bits for signal processing. One receiver channel consistent with present teachings consists of an amplifier 61 an optional second down conversion through mixer 62 a matched filter 63 an analog to digital buffer amplifier 64 and the analog to digital converter 65.

Figure 5:
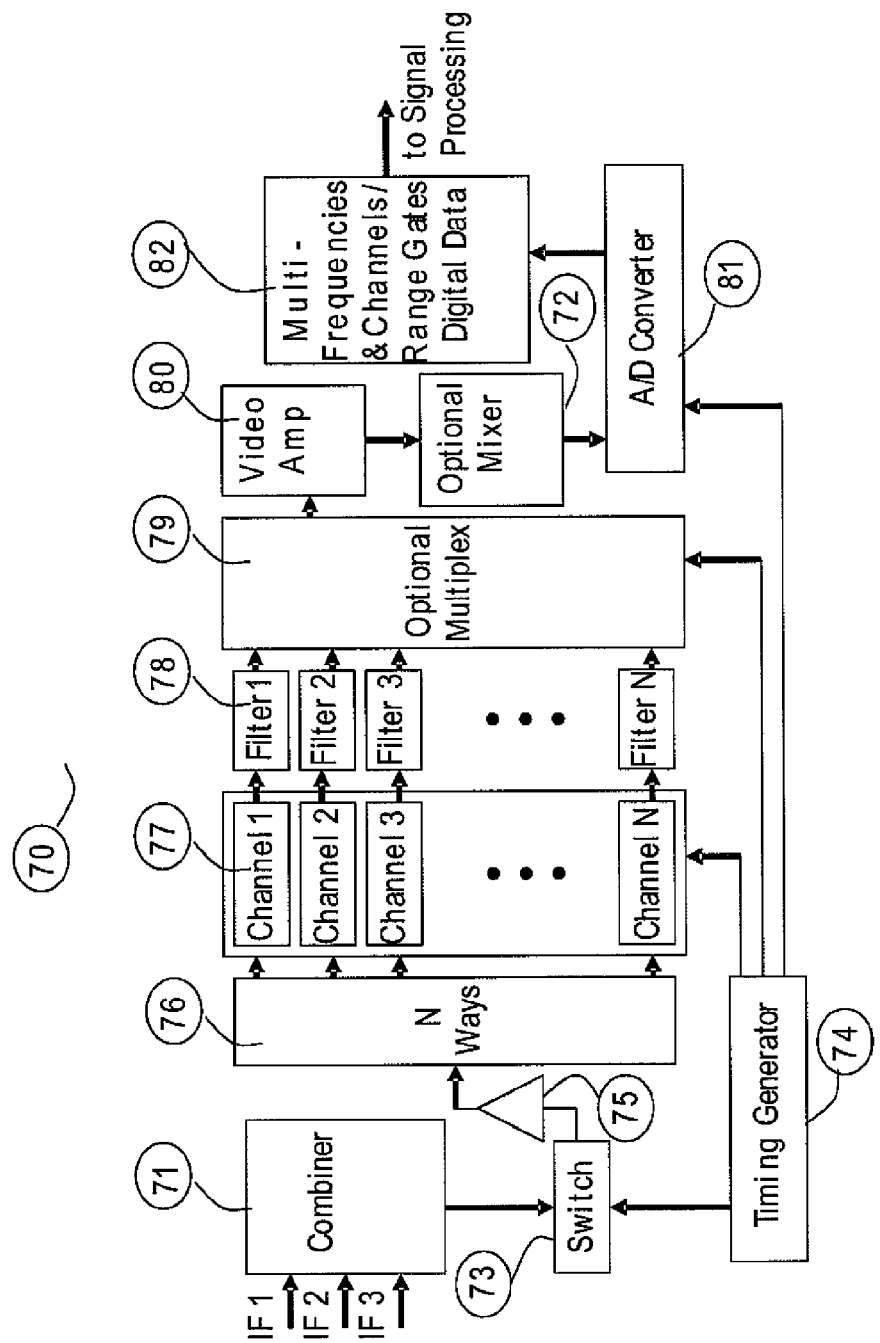
FIG. 5 illustrates a block diagram of multiple frequencies in one Intermediate Frequency receiver channel in accordance with one or more embodiments of the present disclosure.

FIG. 5 is a simplified block diagram showing an illustrative implementation of an alternative IF receiver for better dynamic range performance. Analog range gated centerline IF receiver with multiple closely spaced IF frequencies 70 is a technique that takes advantage of setting the multiple LO frequencies so that the IF frequencies are KHz apart out of the Tx/Rx modules 12. The multiple IF frequencies are fed into power combiner 71 for a single IF channel with multiple orthogonal frequencies. The multiple frequency channel is fed through IF blanking switch 73 and amplified by amplifier 75. The IF is then split 76 into multiple range gates (RG) 77. Range gates are switched to collect target energy at programmed times or ranges with timing generator 74. This collected energy is summed in a narrow Surface Acoustic Wave (SAW) or crystal filter 78 to extract the center spectral line. The narrow filters 78 store the energy and can be multiplexed 79, 80 and sampled with an analog to digital (A to D) converter 81 at a lower rate for higher dynamic performance. The range gated energy is multiplexed while the frequencies are still orthogonal and are automatically separated in the FFT processing. Optional mixer 72 could also be used to lower the frequency for improved A to D performance.

Figure 6:
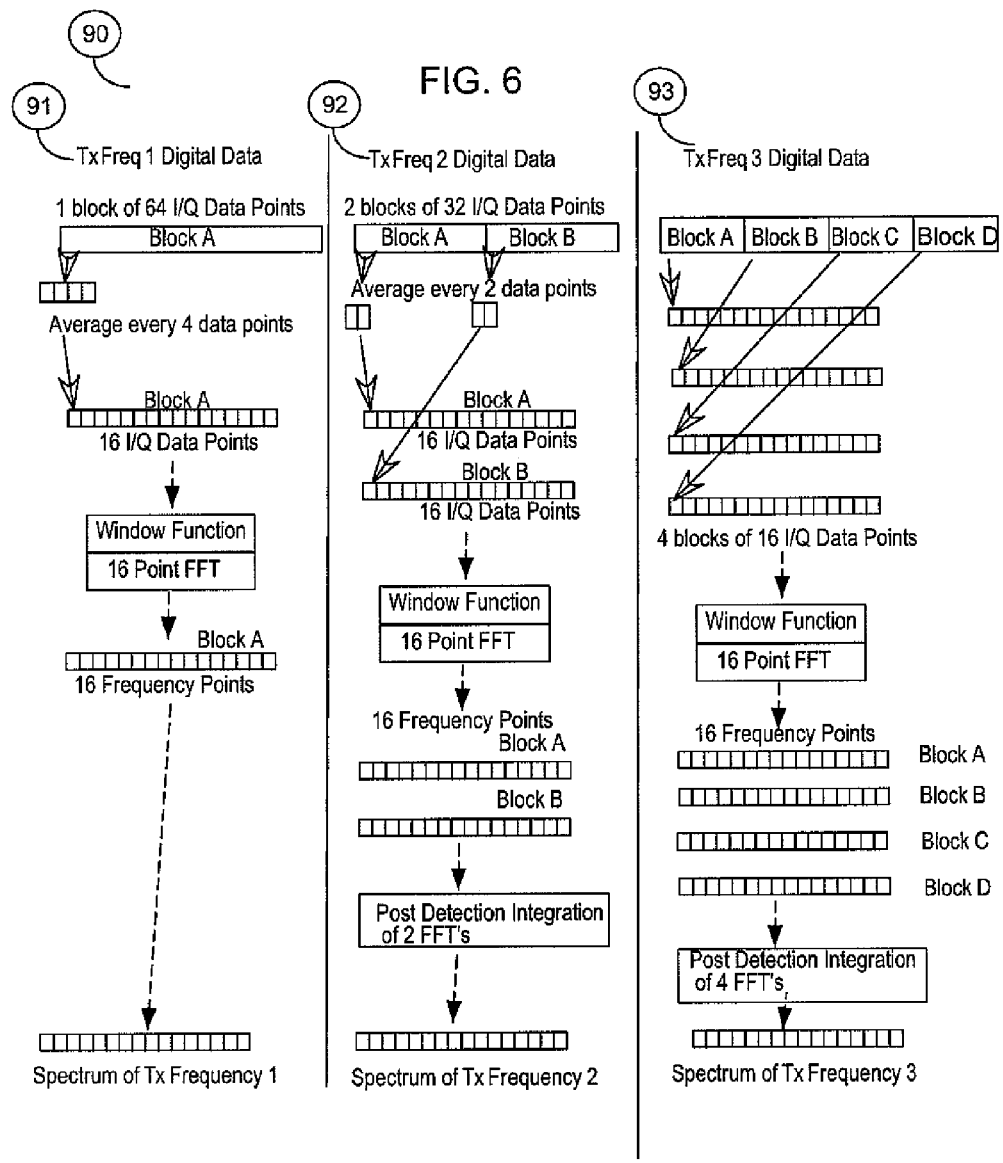
FIG. 6 is a flow chart of the radar digital signal segmentation and processing in accordance with one or more embodiments of the present disclosure.

FIG. 6 is a simplified block diagram showing an illustrative implementation of a preferred method to efficiently perform data segmentation and FFT's for generating target spectrum responses to multiple harmonic transmit frequencies 90. The goal is to closely match the Doppler frequencies due to target movement for each of the transmit frequencies. Doppler frequency shift due to target movement equals two times the relative target velocity times the transmit frequency divided by the speed of light. With the same target for all frequencies the only variable is the transmit frequency. Therefore we will set the product of transmit frequency times the data collection duration nearly equal. FIG. 6 shows an example of segmentation and FFT's for 3 frequency channels harmonically related. The following example is one possible embodiment of the invention used to exemplify the radar digital signal segmentation and processing and is not meant to represent all possible embodiments. Digital data from the lowest frequency, Tx freq 1 Digital Data 91, is segmented by starting with a block of 64 digital I/Q data points. The data points are decimated by 4 (every 4 points averaged into one point). This creates an array of 16 I/Q data points. The data points are windowed and FFT'd to generate a Doppler spectrum of transmit frequency 1.

Digital data from the doubled frequency, Tx Freq 2 Digital Data 92, is segmented into two blocks of 32 points each. Each block of 32 points is decimated by 2 (every two points averaged into one point). This generates two blocks of 16 points of I/Q data. The two blocks are independently windowed and FFT'd and then averaged together (post detection integration) into a single spectrum of 16 points.

Digital data from the quadrupled frequency, Tx Freq 3 digital data 93, is segmented into four blocks of 16 points each. The 4 blocks are independently windowed and FFT and then averaged together (post detection integration into a single spectrum of 16 points.

Figure 7:
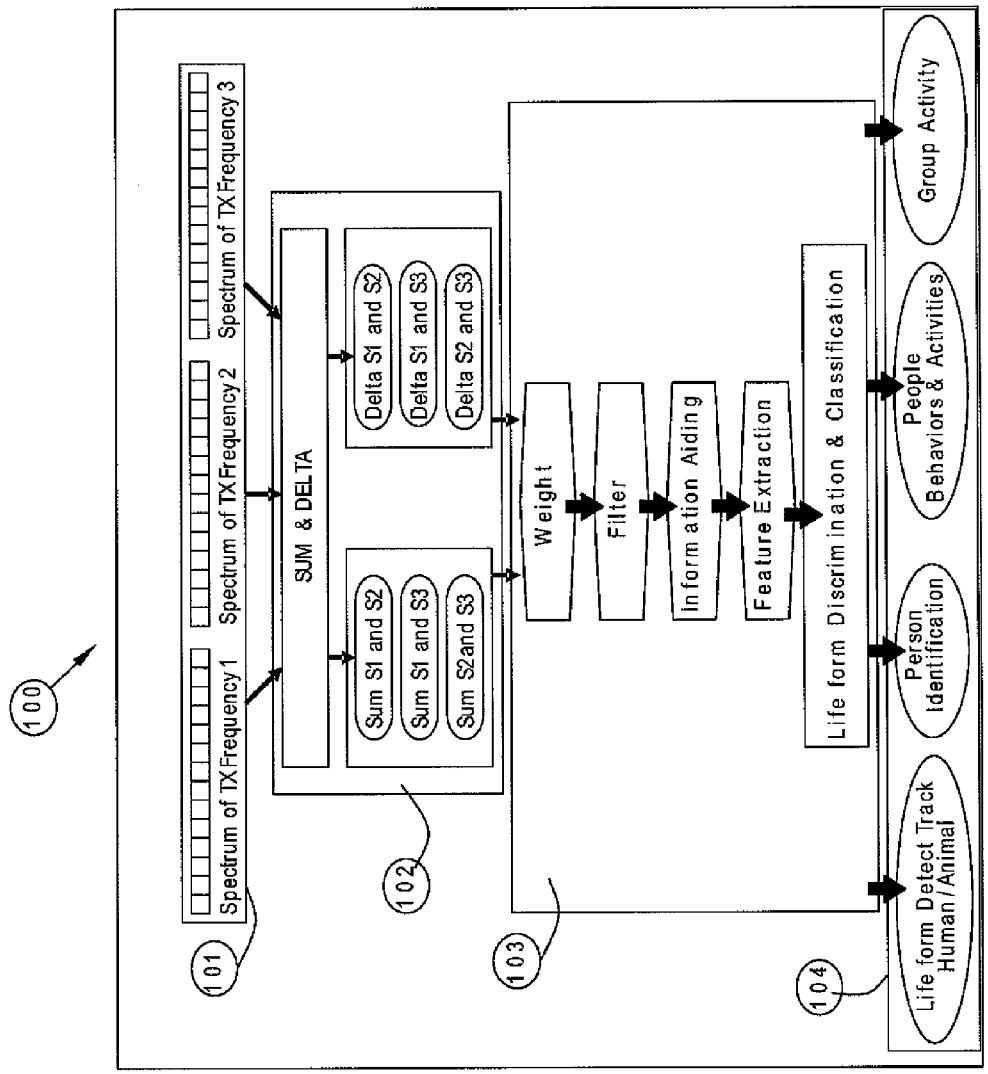
FIG. 7 is a flow chart of the radar digital signal processing and classification in accordance with one or more embodiments of the present disclosure.

The output of the signal processing illustrated in FIG. 6 is the Doppler spectrum for each transmit frequency sorted into like bins and data lengths for correlations. FIG. 7 is a simplified block diagram showing an illustrative implementation of a classifier to transform the Doppler spectrum data into life form targets and actions. Classifier 100 is an example of the use of three transmit frequency Doppler spectrums and is not meant to describe all embodiments. The classifier 100 uses the Doppler spectrum data S1, S2 and S3 101 and calculates the sum and difference ratios 102. The sum and difference ratios along with the direct spectrums 101 are fed into a classifier 103. The classifier 103 shown is a simplified one layer convolution network classifier but the implementation could use any of the presently known classifier techniques. The result will be life form target classification 104 of human or animal actions.

FIGS. 8a and 8b show the difference between conventional imaging techniques using SAR data and this invention. FIG. 8a is a diagram showing an illustrative example 110 of how current imaging SAR systems chop up the radar data into pixels 111, which is then processed using image based classifiers 112. This puts a burden on the hardware, operation and signal processing. FIG. 8b shows how this invention uses the target response to multiple frequencies 113 to extract life form target types and movements 114.

We claim:

1. A method comprising:
    simultaneously transmitting a plurality of RF pulse trains, each of the transmitted RF pulse trains having a different transmission carrier frequency;
    receiving returns of the RF pulse trains reflected from a life form target;
    processing the returns to generate digital radar data associated with the transmission carrier frequency of each RF pulse train;
    segmenting and processing the digital radar data to generate a Doppler spectrum response associated with the transmission carrier frequency of each RF pulse train; and
    performing target classification using the Doppler spectrum responses to extract biometric data describing the life form target.

2. The method as recited in claim 1, further comprising generating an image representing the life form target from the biometric data.

3. The method as recited in claim 1, wherein the transmission carrier frequencies of the RF pulse trains comprise harmonic frequencies.

4. The method as recited in claim 1, wherein the processing of the returns to generate digital radar data associated with the transmission carrier frequency of each RF pulse train comprises:
    outputting closely spaced intermediate frequencies from the returns; and
    processing the intermediate frequencies with a range gated center line intermediate frequency receiver to generate the digital radar data.

5. The method as recited in claim 4, wherein the outputting of the closely spaced intermediate frequencies from the returns comprises down converting and digitizing the returns.

6. The method as recited in claim 1, wherein the segmented digital radar data is processed using fast Fourier transforms (FFT).

7. The method as recited in claim 6, wherein the segmented digital radar data processed using fast Fourier transforms (FFT) is averaged.

8. The method as recited in claim 1, wherein the digital radar data is averaged so that a product of the transmission carrier frequency and data collection duration for the digital radar data associated with each transmission carrier frequency is at least nearly equal.

9. The method as recited in claim 1, wherein the biometric data comprises at least one of life form type or life form movement.

10. The method as recited in claim 1, wherein the performing of target classification using the Doppler spectrum responses to extract biometric data describing the life form comprises determining sum and difference ratios for the Doppler spectrum responses, the sum and difference ratios used to extract the biometric data.

11. A radar system comprising:
    a transmit/receive module configured to simultaneously transmit a plurality of RF pulse trains having discrete transmission carrier frequencies and to independently receive returns of the RF pulse trains reflected from a life form target;
    an intermediate frequency receiver configured to generate digital radar data corresponding to each of the returns;
    a signal processing module configured to segment and process the digital radar data to generate a Doppler spectrum response associated with the transmission carrier frequency of each RF pulse train; and a classifier configured to perform target classification using the Doppler spectrum responses to extract biometric data describing the life form target.

12. The radar system as recited in claim 11, wherein the transmission carrier frequencies of the RF pulse trains comprise harmonic frequencies.

13. The radar system as recited in claim 11, wherein the transmit/receive module is configured to output closely spaced intermediate frequencies from the returns and the intermediate frequency receiver comprises a range gated center line intermediate frequency receiver configured to process the intermediate frequencies to generate the digital radar data.

14. The radar system as recited in claim 13, wherein the transmit/receive module is configured to down convert and digitize the returns to output the closely spaced intermediate frequencies.

15. The radar system as recited in claim 11, wherein the signal processing module is configured to process the segmented digital radar data using fast Fourier transforms (FFT).

16. The radar system as recited in claim 15, wherein the signal processing module is configured to average the segmented digital radar data processed using fast Fourier transforms (FFT) so that a product of the transmission carrier frequency and data collection duration for the digital radar data associated with each transmission carrier frequency is at least nearly equal.

17. The radar system as recited in claim 11, wherein the classifier is configured to determine sum and difference ratios for the Doppler spectrum responses, the sum and difference ratios used to extract the biometric data.

18. The radar system as recited in claim 11, wherein the classifier comprises a convolution network classifier.

19. The radar system of claim 11, wherein the RF pulse trains having pulse widths in the range of 2 to 200 nanoseconds and the transmission carrier frequencies of the RF pulse trains are spaced greater than 400 MHz apart.

20. A radar system comprising:
a plurality of transmit/receive channels configured to simultaneously transmit a plurality of RF pulse trains having discrete transmission carrier frequencies and to independently receive returns of the RF pulse trains reflected from a life-form target, the plurality of transmit/receive channels further configured to output intermediate frequencies corresponding to each of the returns;
an intermediate frequency receiver configured to process the intermediate frequencies to generate digital radar data associated with the transmission carrier frequency of each RF pulse train;
a signal processing module configured to segment and process the digital radar data using fast Fourier transforms (FFT) and averaging to generate a Doppler spectrum response associated with the transmission carrier frequency of each RF pulse train; and
a classifier configured to perform target classification using the Doppler spectrum responses to extract biometric data describing the life form target.

21. The radar system of claim 20, wherein the RF pulse trains having pulse widths in the range of 2 to 200 nanoseconds and the transmission carrier frequencies of the RF pulse trains are spaced greater than 400 MHz apart.

* * * * *